June 3, 1952
L. E. ASKE
2,599,038
TOASTER HEATING ELEMENT
Filed Nov. 19, 1949
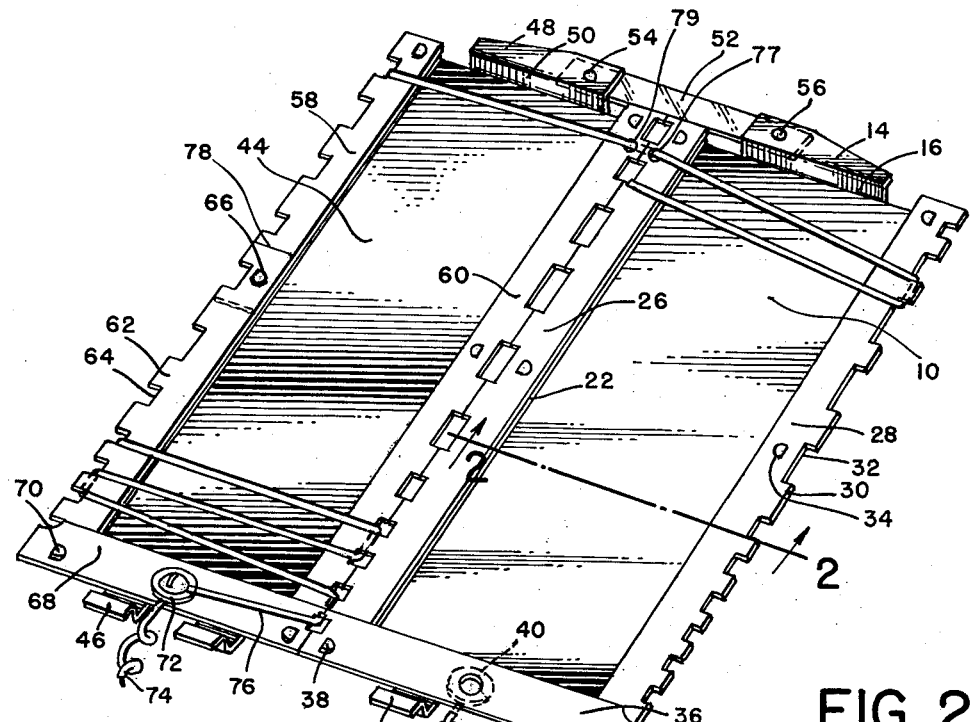
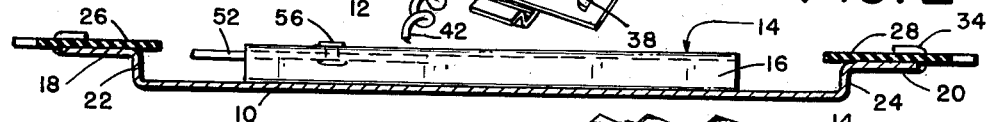
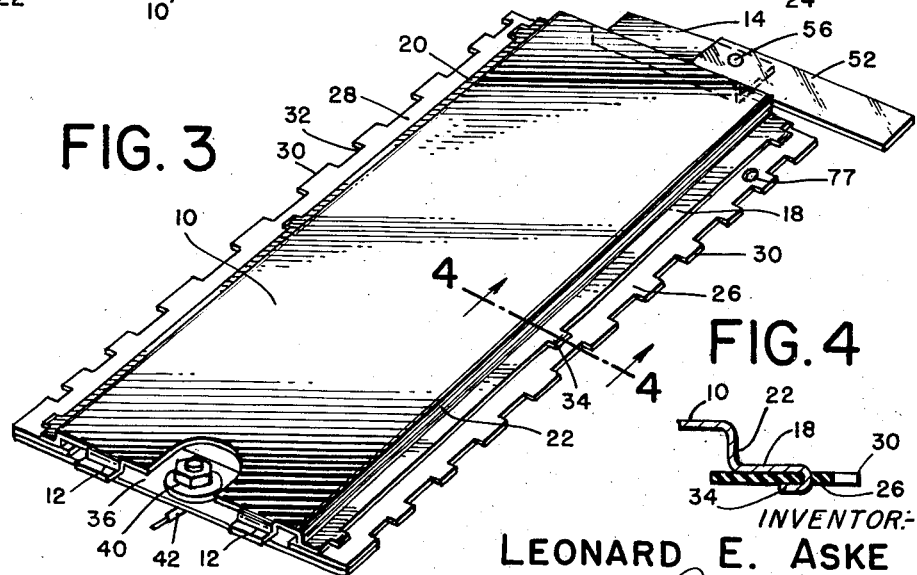
INVENTOR:
LEONARD E. ASKE
BY *William C. Babcock* ATTORNEY Patented June 3, 1952

2,599,038

UNITED STATES PATENT OFFICE 2,599,038

TOASTER HEATING ELEMENT

Leonard E. Aske, Minneapolis, Minn., assignor to General Mills, Inc., a corporation of Delaware Application November 19, 1949, Serial No. 128,343

2 Claims. (Cl. 219—19)

1

The present invention relates to improvements in the construction of electrical heating elements, and particularly heating elements for use in toasters and similar appliances.

In the prior art it has been customary to support the electrical heating resistance of a toaster heating element on a single plane sheet of relatively stiff insulating material such as mica. Occasionally, a metallic or other plate is located a predetermined distance from the face of the mica sheet opposite to that on which the element is wound. While this arrangement gives a satisfactory oven effect for the heating element, the presence of the mica throughout the surface of the metal plate interferes with the operation of the plate as a reflector of heat toward the product to be cooked. Furthermore, it is difficult and expensive to obtain the relatively large sheets of mica with the desired insulating characteristics at a cost which is reasonable in proportion to the costs of other portions of such an appliance.

It is therefore one object of the present invention to provide an improved heating element for toasters and similar appliances.

It is a further object to provide a heating element in which relatively smaller and more economical pieces of insulating material may be used without sacrificing the necessary strength and rigidity of construction of such a heating element.

Another object is the provision of a heating element in which the main support is provided by a metallic reflecting plate having relatively narrow strips of insulating material mounted at each of two opposed edges of the plate.

A still further object is the provision of a heating element of improved reflecting characteristics.

Other objects and advantages will be apparent from the following specification in which a preferred embodiment of the invention has been described.

In the drawings forming a part of this application,

Figure 1 is a perspective view of a heating element according to one embodiment of the invention.

Fig. 2 is a sectional view on the line 2—2 of Fig. 1.

Fig. 3 is a bottom perspective view of a portion of the element of Fig. 1, and

Fig. 4 is a sectional view on the line 4—4 of Fig. 3.

The heating element shown in the drawings is made up of two substantially identical sections. The right hand section of Fig. 1 includes a metal reflector plate 10 provided at one end with offset projecting lugs 12 for engagement with a supporting frame member of a toaster or similar device. The other end of plate 10 is provided with a projecting flange 14 which is offset from the plane of plate 10 by a perpendicular edge or shoulder 16. The flange 14 serves as part of the connecting means for the two sections of the heating element as described below.

As shown in Fig. 2, the plate 10 also has projecting flanges 18 and 20 at opposite longitudinal edges of the plate. These flanges 18 and 20 are offset in the same direction from the plane of plate 10 by perpendicular shoulders 22 and 24, respectively.

Mounted on the longitudinal offset flange 18 is a relatively narrow strip 26 of mica or other relatively stiff insulating material. A similar strip of insulation 28 is mounted on flange 20. The outer edge of each of insulation strips 26 and 28 projects outwardly beyond the edge of the corresponding supporting flanges 18 and 20. These projecting edges of the insulating strips are provided with projections 30 separated by notches 32 which serve as a convenient supporting means for the electrical heating resistance described below. The insulating strips 26 and 28 are held in place on the flanges 18 and 20 by a plurality of retaining lugs or clamps 34 (Fig. 4) which project through the insulation strips and are bent over as shown in the drawing.

At one end of the plate 10, in this case the lower end, another relatively narrow strip of insulating material is provided at 36, extending across the plate between the strips 26 and 28. This cross member 36 is held in place by lugs 38 which are similar to the lugs 34 described above. Lugs 38 may also serve as retaining members for the ends of the side strips 26 and 28.

On the insulating cross strip 36 is provided a terminal 40 to which one of the electrical supply leads 42 is connected.

The second section of the heating element is substantially similar to the first and includes a metal reflector plate 44 having offset projections 46 at one end similar to the projections 12 of plate 10. At the upper end an offset projecting flange 48 is provided, the flange being joined to the main plate portion 44 by a perpendicular shoulder or edge 50. A connecting member or rigid cross piece 52 is riveted at 54 and 56 to the flanges 48 and 14 of the respective plates 44 and 10. Because of the engagement of the lower edge of cross member 52 against the perpendicular shoulders or edges 50 and 16 of the plates, a single rivet is sufficient at each of the indicated points to hold the parts without any possibility of twisting.

The opposite longitudinal edges of the reflecting plate 44 are provided with offset flanges similar to those described in connection with plate 10. On these flanges, relatively narrow insulating strips 58 and 60 are mounted. These insulating strips also project outwardly beyond the edges of the offset flanges of the plate 44, and the projecting portions are provided with tongues 62 and intermediate notches 64 by means of which the heating resistance wire is supported. Retaining lugs or clamps 66, similar to lugs 34 of plate 10, are provided to hold the strips 58 and 60 in position. A bottom cross strip of mica is provided at 68 and is held in place by additional lugs 70 which may also serve to attach the lower ends of the longitudinal insulating strips 58 and 60. On this cross piece of insulating material 68 another terminal 72 is mounted for connection to another electrical lead 74.

The heating resistance wire 76 is supported by the insulating strips at the edge of each plate so that the major portion of the heating element extends back and forth between the insulating strips opposite the surface of the reflecting plate and spaced outwardly away from the plate. Thus as shown in Figure 1, the resistance wire 76 may be connected at one end to terminal 72 and is then carried to one edge of the plate 44 where it passes beneath one of the insulating projections 62 and is then led back to the opposite edge of plate 44 where it is led beneath one of the corresponding projections on that side of the element. The wire is crisscrossed in this fashion to the upper edge of plate 44 at which point the wire is carried on over to the insulating strips 26 and 28 of plate 10 and is supported by the projections of those insulating strips in similar fashion. The other end of the resistance wire 76 is finally connected to the terminal 40 of plate 10 so that the circuit is completed between leads 42 and 74. Holes 77 and 79 help support the wire.

For convenience in assembly of the heating element, it is ordinarily desirable to wind the resistance wire from one of the terminals to the opposite end of one of the plates 44 before the plates 44 and 10 are both interconnected by the cross piece 52. The mounting of the resistance wire 76 is then continued across to the second plate and wound back along the second plate to its terminal, after which the plates may be firmly connected to each other by means of the cross piece 52 and rivets 54 and 56.

According to the foregoing description a heating element construction has been provided which offers definite advantages in economy and ease of manufacture and in efficiency of operation. Instead of the customary large and relatively expensive sheets of mica or similar insulating material, the heating element utilizes only relatively thin strips of this material. It is not even necessary to utilize a strip extending the full length of the plates 10 and 44 since shorter strips may be overlapped to serve the same purpose, as shown at 78. Finally, the major portion of the electrical heating resistance lies opposite the surface of one of the reflecting plates 10 or 44 so that the element can transmit heat to the particular product involved both by direct radiation and also by reflection from the metallic plate. Since there is no layer of mica or other supporting insulation between the resistance element and the plate over this major area, the efficiency of this heat reflecting action will be greatly increased.

Since minor variations and changes in the exact details of construction will be apparent to persons skilled in this field, it is intended that this invention shall cover all such changes and modifications as fall within the spirit and scope of the attached claims.

Now, therefore, I claim:

1. A heating element comprising a pair of reflector plates, connecting means mounting the plates side by side in spaced coplanar relation and including an integral offset flange at one end of each plate, and a crossbar riveted at a single point to each flange and engaging the offset edge of each flange to maintain the plates in alignment, the adjacent edges of the plates and the edge of each plate opposite said adjacent edges having relatively narrow integral flanges offset in a common plane spaced from the plane of the plates, a strip of insulating material mounted on each flange and having a notched edge projecting outwardly beyond the flange, and an electrical heating resistance wound back and forth across one face of one plate and then back and forth across the corresponding face of the other plate and supported by the notched edges of the strips at opposite edges of each plate, the main intermediate length of the resistance between the strips being spaced from the plate and supplying heat both by direct radiation and by reflection from the plate, the reflector plate being free of insulation between the flanges.

2. A heating element comprising a pair of reflector plates, connecting means mounting the plates side by side in spaced coplanar relation, said connecting means consisting of a single cross member located at only one end of the plates and secured thereto, the other end of each plate having a projecting lug for engagement with a support, the adjacent edges of the plates and the edge of each plate opposite said adjacent edges having relatively narrow integral flanges offset in a common plane spaced from the plane of the plates, a strip of insulating material mounted on each flange and having a notched edge projecting outwardly beyond the flange, and an electrical heating resistance wound back and forth across one face of one plate and then back and forth across the corresponding face of the other plate and supported by the notched edges of the strips at opposite edges of each plate, the main intermediate length of the resistance between the strips being spaced from the plate and supplying heat both by direct radiation and by reflection from the plate, the reflector plate being free of insulation between the flanges.

LEONARD E. ASKE.

REFERENCES CITED

The following references are of record in the file of this patent:

UNITED STATES PATENTS

| Number | Name | Date |
|---|---|---|
| 533,795 | Edwards | Feb. 5, 1895 |
| 1,480,084 | Lamb | Jan. 8, 1924 |
| 1,561,309 | Colby | Nov. 20, 1925 |
| 1,842,174 | Johnson | Jan. 19, 1932 |
| 1,878,968 | Miller et al. | Sept. 20, 1932 |
| 1,900,249 | Miller et al. | Mar. 7, 1933 |
| 1,948,739 | Wolcott et al. | Feb. 27, 1934 |
| 2,316,699 | Myers | Apr. 13, 1943 |
| 2,462,607 | Browne | Feb. 22, 1949 |
| 2,493,542 | McGraw | Jan. 3, 1950 |
| 2,548,511 | Anderson | Apr. 10, 1951 |